J. BLUE.
Harvester.
No. 30,953.
Patented Dec. 18, 1860.
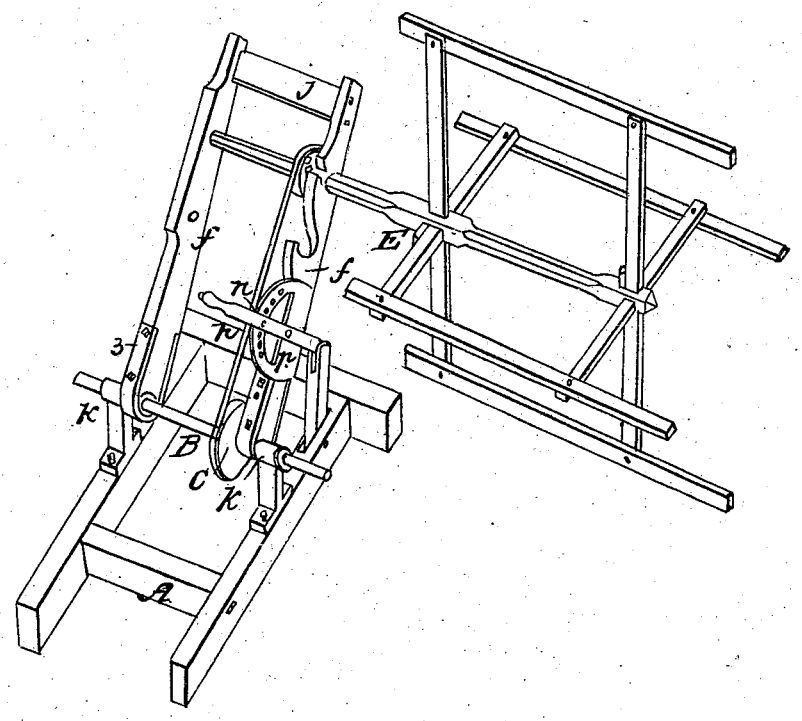
Witnesses
R. C. Tompkins
M. Crawford
Inventor
John Blue

UNITED STATES PATENT OFFICE.

JOHN BLUE, OF COVERT, NEW YORK.

IMPROVEMENT IN HARVESTERS.

Specification forming part of Letters Patent No. 30,953, dated December 18, 1860.

*To all whom it may concern:*

Be it known that I, JOHN BLUE, of Covert, in the county of Seneca and State of New York, have invented a new and useful Improvement in Harvesters; and I do hereby declare that the following is a full, clear, and exact description of my said improvement, and of the manner of making, constructing, and using the same, reference being had to the accompanying drawing, making a part of this specification, in which my improvement is represented.

The object of my invention is to enable the driver in the seat of the machine, while in cutting motion, easily to adjust the elevation of the reel to the variable conditions of the grass and grain through which the machine moves.

It consists in combining a knee-joint, having a spring-catch or other device for holding the joint in position upon one of the levers forming the joint, with reel-standards hinged on bearings of hooks or bolts arranged in line with the shaft of the wheel directly driving the reel, for the purpose of permitting the movement of the standards on the hinge without deranging the band or gear driving the reel.

The accompanying drawing, being a delineation of a reel with standards cross-braced and hinged on hooks arranged in line with the shaft of the wheel which directly drives the reel, and combined with a knee-joint having a spring-catch upon one of the levers forming the same for actuating the hinge, represents my improvement.

In this drawing, A represents the frame of a harvester; B, the shaft of the wheel directly driving the reel; C, this wheel; D, the pulley directly driven by the wheel C; E, the reel; $ff'$, the reel-standards; $gg'$, the hinge-loops; $p$, the plate forming the series of notches; $n$, the pin catching into the same; $h$, the catch-lever; $i$, the knee-joint; $j$, the cross-brace; and $kk'$, the hooks arranged in line with the shaft B, on which hooks the loops $gg'$ hinge.

My improvement is made and constructed by making a reel in the common way with two bearings on one projecting end of its shaft, as far apart as convenient for its adaptation to the other parts of the machine, as represented by E. Across the top of the two standards which support the reel is formed a brace in length equal to the distance between the outsides of the bearings on the shaft of the reel, and corresponding boxes are made in the standards, as represented by the cross-brace $j$ and the standards $ff'$. A loop of iron is bent and bolted over the lower end of each of these standards, leaving sufficient space for a hook parallel with the shaft of the reel. These loops are hinged upon bolts or hooks arranged in line with the shaft of the wheel which directly drives the reel, as represented by the hooks $kk'$. In case, as in some make of machines, this shaft turns, and is so long as to occupy the place for the center of either bolt or hook, a hole is made in the center of the same for the shaft to turn in, as represented by the hooks $kk'$, each of which serves for both hook and box; but in case, as in other make of machines, the shaft is fastened rigidly to the frame and the wheel turns thereon, the shaft itself is used for one or both, as its length indicates, of the bolts for the loops to hinge on; and in case the shaft is so short as not to occupy the place for the bolt or hook, the same is made without the hole through the center.

For actuating the hinge, a catch-lever with an ordinary spring pin or catch, and a corresponding circular plate of corresponding pin holes or notches, forming, with another lever, a knee-joint, is attached to the standard next to the reel, as represented by the lever $h$, knee-joint $i$, spring-pin $n$, and circular plate $p$.

Motion is communicated to the wheel C by any of the usual modes of communicating motion to such wheels, which are too well known to need description.

My improvement is used by straightening the joint $i$, in raising the lever $h$, whenever the elevation of the reel is desired, and flexing this joint in lowering this lever whenever its depression is desired.

I do not claim the devices employed, for they have been used in different arrangement in the harvesting-machine; but

What I claim as my invention, and desire to secure by Letters Patent, is—

The combination of the knee-joint $i$ with the reel-standards $ff'$, shaft B, and bearings $kk'$, when these several parts are arranged for operation in the manner described, for the purpose specified.

JOHN BLUE.

Witnesses:
R. C. TOMPKINS,
GEO. S. THOMPSON.